US012572399B2

(12) United States Patent
Brezner et al.

(10) Patent No.: US 12,572,399 B2
(45) Date of Patent: Mar. 10, 2026

(54) WAITING ROOM WITH ZERO LATENCY

(71) Applicant: Imperva, Inc., San Mateo, CA (US)

(72) Inventors: Oren Brezner, Rishon LeZion (IL); Nir Gabay, Rehovot (IL); Ortal Hasid, Modi'in (IL); Shlomit Abergel, Rehovot (IL)

(73) Assignee: Imperva, Inc., San Mateo, CA (US)

( * ) Notice: Subject to any disclaimer, the term of this patent is extended or adjusted under 35 U.S.C. 154(b) by 0 days.

(21) Appl. No.: 18/538,504

(22) Filed: Dec. 13, 2023

(65) Prior Publication Data

US 2024/0241776 A1    Jul. 18, 2024

Related U.S. Application Data

(63) Continuation of application No. 17/450,155, filed on Oct. 6, 2021, now Pat. No. 11,900,182.

(51) Int. Cl.
G06F 9/54 (2006.01)
G06F 16/957 (2019.01)
(Continued)

(52) U.S. Cl.
CPC .............. G06F 9/546 (2013.01); G06F 9/547 (2013.01); G06F 16/9574 (2019.01);
(Continued)

(58) Field of Classification Search
CPC ...... G06F 9/546; G06F 9/547; G06F 16/9574; G07C 11/00; G07C 2011/04; H04L 67/56; G06Q 30/0201
See application file for complete search history.

(56) References Cited

U.S. PATENT DOCUMENTS 6,836,785 B1    12/2004    Bakshi et al.
8,417,817 B1     4/2013    Jacobs
(Continued)

FOREIGN PATENT DOCUMENTS

KR    10-2003-0089285 A    11/2003
WO       2012/072690 A1     6/2012
WO       2016/155491 A1    10/2016

OTHER PUBLICATIONS

Akamai Technologies, Inc., "Visitor Prioritization workflow," Visitor Prioritization Cloudlet guide, Copyright 2021, downloaded from https://learn.akamai.com/en-us/webhelp/visitor-prioritization/visitor-prioritization-guide/GUID-72509DED-5803-408D-A887-902910DCB03E.html on Oct. 6, 2021, 1 page.
(Continued)

*Primary Examiner* — Charles E Anya

(57)                ABSTRACT

A method by one or more computing devices functioning as a ticket master for a website that has a virtual waiting room, wherein the ticket master is communicatively coupled to a plurality of proxies controlling access to the website. When the ticket master is in a relaxed mode (as opposed to a pressure mode), the method includes pre-allocating a number of tickets to the plurality of proxies for a first upcoming time period and setting a queue head for the first upcoming time period to a ticket number of a last ticket created, wherein the number of tickets that are pre-allocated for the first upcoming time period is greater than a target number of users allowed to enter the website during the first upcoming time period but less than a predefined maximum sudden spike number.

17 Claims, 9 Drawing Sheets

(51) Int. Cl.

| | |
|---|---|
| *G06Q 30/0201* | (2023.01) |
| *G07C 11/00* | (2006.01) |
| *H04L 67/56* | (2022.01) |

(52) U.S. Cl.
CPC .............. *G07C 11/00* (2013.01); *H04L 67/56* (2022.05); *G06Q 30/0201* (2013.01); *G07C 2011/04* (2013.01)

(56) References Cited

U.S. PATENT DOCUMENTS

| | | | |
|---|---|---|---|
| 11,128,732 B1 | 9/2021 | Czerpak et al. | |
| 2002/0087714 A1* | 7/2002 | Connor ................. | H04L 69/329 |
| | | | 709/235 |
| 2011/0282980 A1 | 11/2011 | Kumar et al. | |
| 2014/0052835 A1 | 2/2014 | Felton et al. | |
| 2014/0122663 A1 | 5/2014 | Jordan et al. | |
| 2015/0088697 A1 | 3/2015 | Garnepudi et al. | |
| 2018/0152335 A1* | 5/2018 | Matsuki ................. | H04L 69/16 |

| | | | |
|---|---|---|---|
| 2020/0051045 A1 | 2/2020 | Gupta et al. | |
| 2021/0058453 A1* | 2/2021 | Balasubramanian ........................ | H04L 47/6255 |
| 2021/0099758 A1 | 4/2021 | Narasimhan et al. | |

OTHER PUBLICATIONS

Fastly, Inc., "Waiting room," Tutorials, Copyright 2021, downloaded from https://developer.fastly.com/solutions/tutorials/waiting-room/ on Oct. 6, 2021, 17 pages.

Final Office Action, U.S. App. No. 17/450,155, Jun. 23, 2023, 22 pages.

Imperva, Inc., "Cloud Application and Edge Security," Aug. 16, 2021, 7 pages.

Non-Final Office Action, U.S. App. No. 17/450,155, Jan. 30, 2023, 20 pages.

Notice of Allowance, U.S. App. No. 17/450,155, Sep. 13, 2023, 21 pages.

\* cited by examiner

FIG. 6

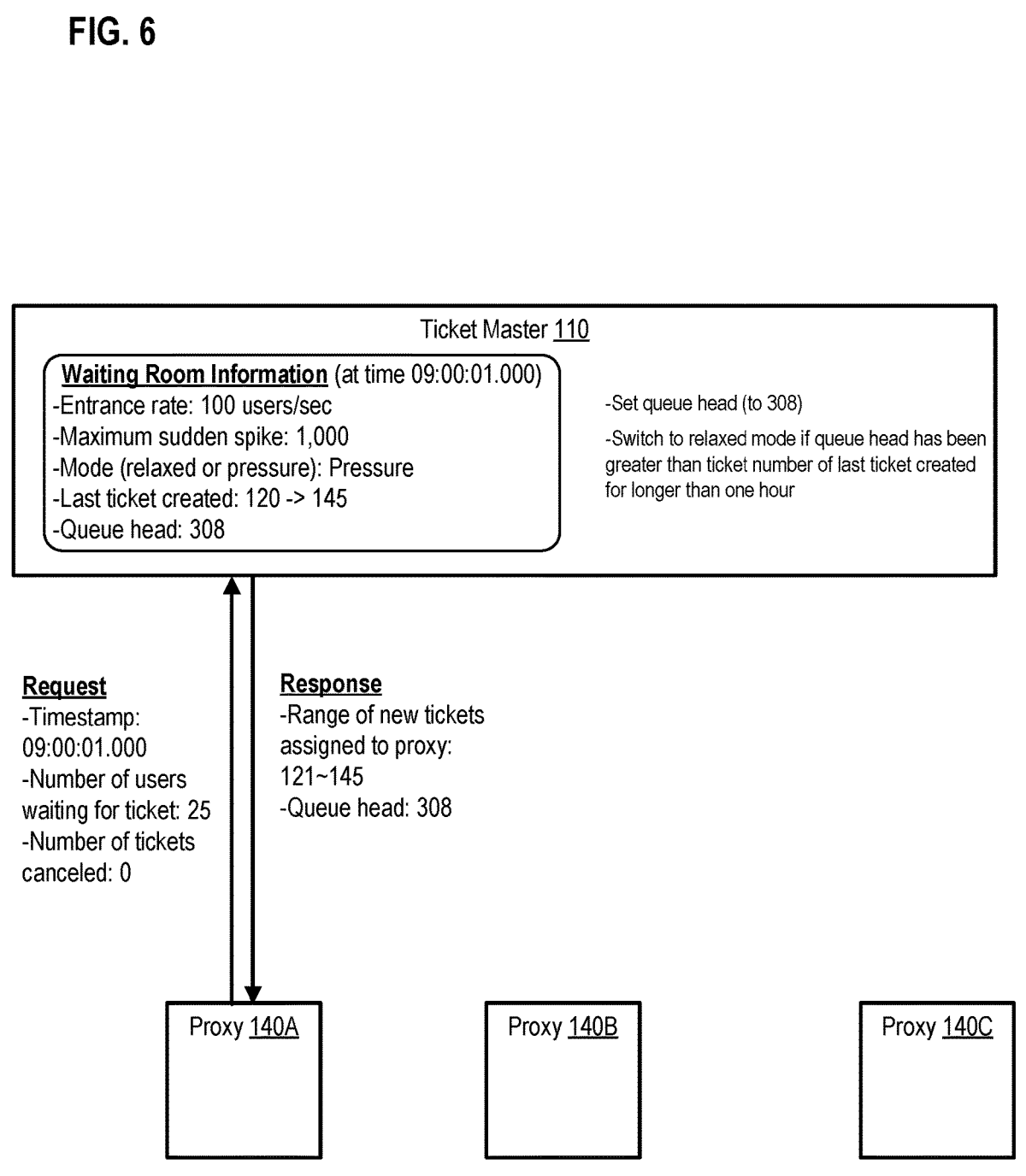

Ticket Master <u>110</u>

<u>Waiting Room Information</u> (at time 09:00:01.000)
-Entrance rate: 100 users/sec
-Maximum sudden spike: 1,000
-Mode (relaxed or pressure): Pressure
-Last ticket created: 120 -> 145
-Queue head: 308

-Set queue head (to 308)

-Switch to relaxed mode if queue head has been greater than ticket number of last ticket created for longer than one hour <u>Request</u>
-Timestamp:
09:00:01.000
-Number of users waiting for ticket: 25
-Number of tickets canceled: 0

<u>Response</u>
-Range of new tickets assigned to proxy:
121~145
-Queue head: 308

Proxy <u>140A</u>

Proxy <u>140B</u>

Proxy <u>140C</u>

WAITING ROOM WITH ZERO LATENCY

CROSS-REFERENCE TO RELATED APPLICATIONS

This application is a continuation of application Ser. No. 17/450,155, filed Oct. 6, 2021 (now U.S. Pat. No. 11,900, 182), which is hereby incorporated by reference.

TECHNICAL FIELD

Embodiments of the invention relate to the field of virtual waiting rooms for websites, and more specifically, to a virtual waiting room that provides low latency.

BACKGROUND

Virtual waiting rooms are used to prevent websites from crashing or becoming unusable during periods of unexpected traffic spikes. When a website that has a waiting room experiences a sudden spike in traffic, a waiting page may be provided to users where users can wait until the website is able to handle additional traffic. A retailer may use a virtual waiting room to ensure that its website can maintain availability and adequate performance when there is a sudden spike in incoming traffic to its website due to certain popular sales events such as Black Friday sales events. Without the waiting room, a sudden spike in incoming traffic to the website may result in the website crashing or the website performance being severely degraded (e.g., the website will load slowly), which in turn results in a bad user experience, which can lead to a loss of sales for the retailer.

The website owner may configure the rate of new users that the virtual waiting room allows to reach the website (e.g., 5,000 new users per minute). A waiting page may be presented to users when the rate of new users exceeds the allowed rate. The waiting page may indicate that the user is in a queue to enter the website, as well as the user's current position in the queue and/or the estimated wait time to enter the website. To ensure fairness, the queue may be implemented using a first-in-first-out (FIFO) queuing mechanism or similar mechanism.

BRIEF DESCRIPTION OF THE DRAWINGS

The invention may best be understood by referring to the following description and accompanying drawings that are used to illustrate embodiments of the invention. In the drawings:

FIG. 6 is a diagram showing an example of a further request sent by a proxy to the ticket master and the corresponding response sent by the ticket master to the proxy to illustrate pressure mode operations, according to some embodiments.

DETAILED DESCRIPTION

Figure 1:
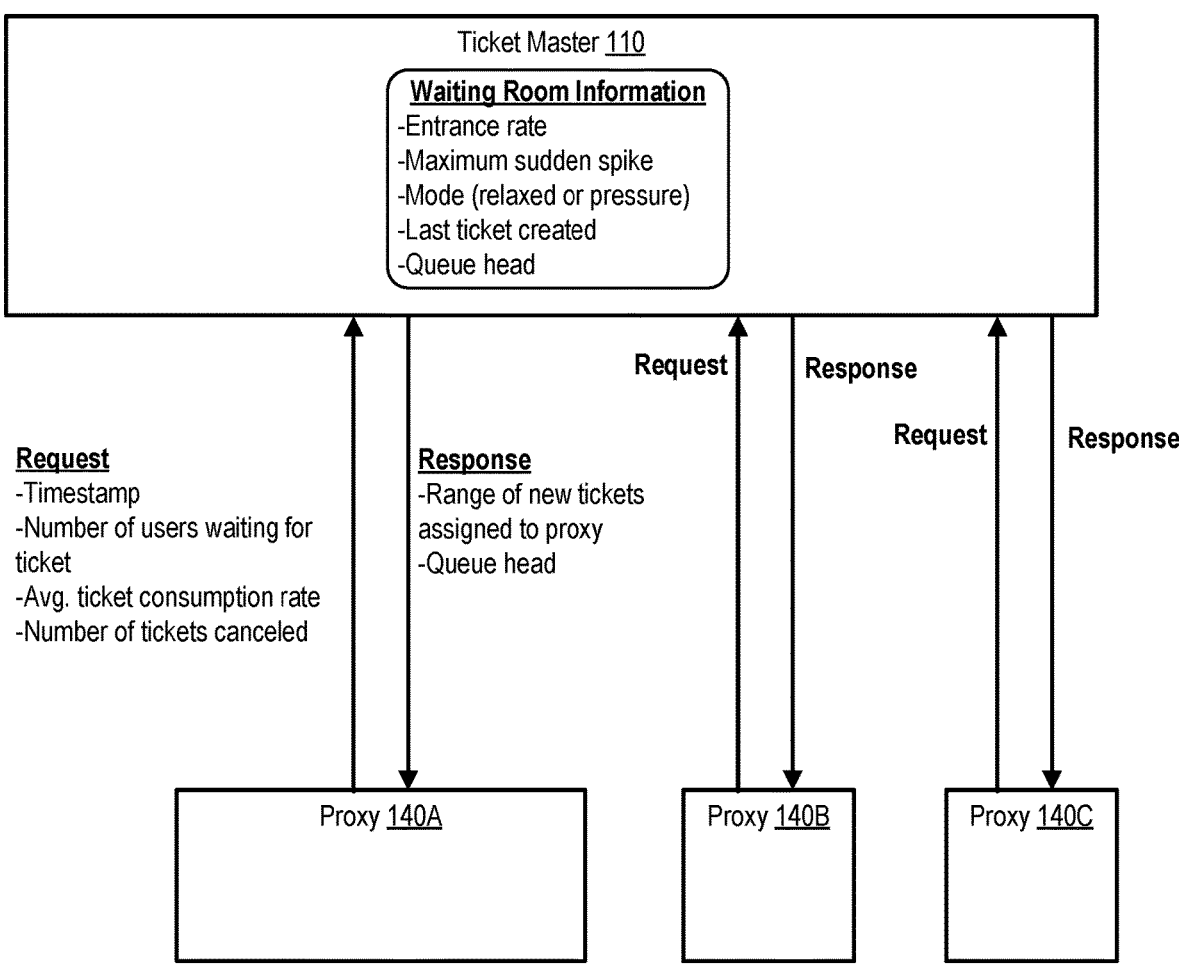
FIG. 1 is a block diagram of an environment in which a virtual waiting room feature that provides low latency can be implemented, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

Virtual waiting rooms are used to prevent websites from crashing or becoming unusable during periods of unexpected traffic spikes. When a website experiences a sudden spike in traffic, a waiting page may be provided to users where users can wait until the website is able to handle additional traffic.

According to one conventional approach, each user has to obtain a ticket from a centralized ticket master to enter a website. This approach is simple to implement and ensures fairness and accuracy in limiting the rate of users entering the website. However, a drawback of this approach is that it introduces latency for each user that enters the website even when the website is not experiencing high user demand.

According to another conventional approach, multiple distributed ticket brokers (e.g., that are distributed across various geographical regions) are deployed that each enforce the rate limit independently. The distribution of tickets among the ticket brokers may be static or dynamic. This approach helps reduce latency compared to the centralized ticket master approach mentioned above. However, a drawback of this approach is that fairness is not achieved globally. Also, the actual rate at which users are allowed to enter the website may be lower than what is allowed since some ticket brokers may be overloaded while others are not.

Due to the drawbacks of the above approaches, some website owners/operators enable and disable the waiting room feature for their websites depending on the user demand experienced by the website. This way, the waiting room feature is disabled during times of normal/low demand, and then enabled during times of high demand. A drawback of this approach is that it takes some non-negligible time to detect the increase in the demand (e.g., to detect an increase in the rate of traffic to the website), and during this time, all users will be allowed to enter the website (because the virtual waiting room is disabled). This means that there could be unbounded spikes of users being allowed to enter the website until the increase in demand is detected and the virtual waiting room feature is enabled, which may cause the website to crash or cause the performance of the website to be severely degraded.

Embodiments provide a virtual waiting room feature for a website that can be always enabled and that provides low latency during times when the website is experiencing normal/low demand, while always bounding the rate at which users are able to enter the website (it ensures that there are no unbounded spikes of users entering the website). While the virtual waiting room feature may introduce some additional latency during times of high demand, this additional latency is typically insignificant since the user has to wait for a comparatively longer time to enter the website anyway. During times of normal/low demand ("relaxed" times), embodiments allow users to enter the website with little to no latency. Embodiments may allow short spikes of users to enter the website but ensure that this spike will be less than a predefined maximum sudden spike. During times of high demand ("pressure" times), embodiments allow users to enter the website at a rate that is close to a predefined target entrance rate while ensuring that the number of users that are allowed to enter the website during a given time period does not exceed the predefined maximum sudden spike.

An embodiment is a method by one or more computing devices functioning as a ticket master for a website that has a virtual waiting room, wherein the ticket master is communicatively coupled to a plurality of proxies controlling access to the website. When the ticket master is in a relaxed mode, the method includes pre-allocating a number of tickets to the plurality of proxies for a first upcoming time period and setting a queue head for the first upcoming time period to a ticket number of a last ticket created, wherein the number of tickets that are pre-allocated for the first upcoming time period is greater than a target number of users allowed to enter the website during the first upcoming time period but less than a predefined maximum sudden spike number. When the ticket master is in a pressure mode, the method may include allocating tickets to the plurality of proxies according to a number of users currently waiting for a ticket at respective ones of the plurality of proxies and setting a queue head for a second upcoming time period to be greater than a current queue head at least by a target number of users allowed to enter the website during the second upcoming time period but less than a sum of a ticket number of a last ticket created and the predefined maximum sudden spike number, wherein the queue head for the second upcoming time period is allowed to be greater than the ticket number of the last ticket created. Embodiments are now described with reference to the accompanying figures.

FIG. 1 is a block diagram of an environment in which a virtual waiting room feature that provides low latency can be implemented, according to some embodiments.

As shown in the figure, the environment includes a ticket master 110 and proxies 140A-C. The ticket master 110 may be communicatively coupled to the proxies 140A-C over a network. The proxies 140A-C may be communicatively coupled between user devices (not shown) and a website (e.g., hosted by a web server) over a network to control access to the website. A network may be any one or any combination of a LAN (local area network), WAN (wide area network), telephone network, wireless network, point-to-point network, star network, token ring network, hub network, or other appropriate configuration. Users may operate their respective user devices to request access to the website (e.g., by interacting with a web browser executing on a user device). The proxies 140A-C may sit inline to the traffic sent by the user devices to the website and make determinations of which traffic should be allowed to reach the website, and thus which users are allowed to enter the website. As will be further described herein, the proxies 140A-C may implement a virtual waiting room feature for the website that returns a waiting page to users when there is a sudden spike of users attempting to access the website. In one embodiment, one or more of the proxies 140A-C implement a web application firewall (WAF) or content distribution network (CDN). The proxies 140A-C may be implemented in the "cloud" or on-premise (e.g., implemented in the same enterprise network as the web server hosting the website). The ticket master 110 and the proxies 140A-C may each be implemented by one or more electronic/network devices.

The ticket master 110 may create tickets for the website and allocate those tickets to the proxies 140A-C. The ticket master 110 may assign ticket numbers to tickets as an ever-increasing number (e.g., an ever-increasing integer), where each new ticket is assigned a higher ticket number than the previous ticket. The ticket master 110 may also set/update a queue head and provide the queue head to the proxies 140A-C. The queue head may indicate the highest ticket number for which entrance to the website is allowed.

When a proxy 140 receives a request from a user to access the website (e.g., the first Hypertext Transfer Protocol (HTTP) request from the user to access content (e.g., a particular HTML page) of the website), it may determine whether the user has already been issued a ticket. If the user has not been issued a ticket, the proxy may attempt to issue a ticket to the user from its allocated tickets (the tickets that the ticket master 110 allocated to the proxy 140). If the proxy 140 has no allocated tickets to issue, then the proxy 140 may return a waiting room page to the user. The waiting room page may indicate to the user that the user is in a queue to enter the website. The waiting room page may include functionality to resend the request to access the website after a period of time (e.g., the waiting room page may include JavaScript code to resend the request after a period of time). If the user has been issued a ticket, then the proxy 140 determines whether the ticket number of the ticket is equal to or less than the queue head. If so, the user is allowed to enter the website (e.g., the user's request is forwarded to the origin server). Otherwise, the proxy 140 returns the waiting room page to the user.

In one embodiment, the proxies 140A-C periodically send requests to the ticket master 110 to obtain tickets from the ticket master 110 (e.g., after a proxy 140 receives a response to a previous request but no sooner than one second between requests). The request sent by a proxy 140 may include various information about the status of the proxy. As shown in the figure, in one embodiment, the request sent by a proxy 140 indicates a timestamp, the number of users waiting for a ticket at the proxy, the average ticket consumption rate of the proxy (e.g., tickets consumed per second for the last three seconds), and the number of tickets canceled at the proxy (e.g., the number of tickets issued to users at the proxy 140 which the users did not use because they decided to stop waiting). A user that is issued a ticket and that is in the virtual waiting room (waiting at the waiting page) may try to reenter the website periodically (e.g., due to execution of the JavaScript mentioned above). A proxy 140 may determine that a ticket issued to the user has been canceled based a determination that the proxy 140 has not seen a request to access the website from the user for a threshold length of time, as this may indicate that the user decided not to wait (e.g., the user closed the waiting room page in its web browser).

The ticket master 110 may determine how many tickets to create for an upcoming time period (as well as the distribution of those tickets among the proxies) and set/update the queue head based on the status information included in the recent requests received from the proxies 140. The ticket master 110 may then send corresponding responses to the proxies 140 that sent requests. As shown in the figure, in one embodiment, the response sent to a proxy 140 indicates the range of tickets allocated to the proxy 140 for the upcoming time period (if any) (where different proxies 140 are allocated tickets with non-overlapping ticket numbers) and the queue head for the upcoming time period. The ticket master 110 may repeat the above operations for each subsequent time period. In one embodiment, the length of each time period is one second. However, other embodiments may use a different length for the time periods.

The ticket master 110 may maintain various information pertaining to the virtual waiting room feature for the website (shown in the figure as "waiting room information"). As shown in the figure, in one embodiment, this waiting room information includes a target entrance rate, a maximum sudden spike, a mode (relaxed mode or pressure mode), a last ticket created, and a queue head.

The target entrance rate indicates the target rate at which new users are allowed to enter the website. The target entrance rate may be configurable by the owner/administrator of the website. In one embodiment, the target entrance rate is expressed in terms of users per second (e.g., 100 new users per second) or a similar metric. The maximum sudden spike indicates the maximum number of users that are allowed to enter the website during any given time period.

The maximum sudden spike may be configurable by the owner/administrator of the website. The mode indicates whether the ticket master 110 is in the relaxed mode or the pressure mode. The last ticket created indicates the ticket number of the last ticket that the ticket master 110 created (the highest ticket number). The queue head indicates the highest ticket number for which entrance to the website is allowed.

The ticket master 110 may have two different modes of operation: (1) a relaxed mode and (2) a pressure mode. When the ticket master 110 is in the relaxed mode, it may pre-allocate a number of tickets to the proxies 140A-C for an upcoming time period and set the queue head for the upcoming time period to the ticket number of the last ticket created. The number of tickets that are pre-allocated for the upcoming time period may be greater than a target number of users allowed to enter the website during the upcoming time period (greater than the target entrance rate multiplied by the length of the upcoming time period) but less than the maximum sudden spike. The tickets that are pre-allocated for the upcoming time period may replace the tickets that were pre-allocated for the previous time period (so that the tickets that were pre-allocated for the previous time period cannot be issued to users during the upcoming time period). When the ticket master 110 is in the relaxed mode, tickets are "pre-allocated" to proxies 140 in the sense that tickets are allocated to the proxies even though the proxies may not have an immediate need for all of those tickets. Pre-allocating tickets to the proxies 140 (and setting the queue head to the ticket number of the last ticket created) allows the proxies 140 to admit users to the website with low latency (e.g., because the proxies 140 may issue tickets to users from its batch of pre-allocated tickets without having to contact the ticket master 110 for tickets). Also, since the number of tickets that are pre-allocated to the proxies 140 for the upcoming time period is less than the maximum sudden spike, the number of users that are allowed to enter the website during the upcoming time period is bounded by the maximum sudden spike. Thus, even if there is a sudden spike in the number of users attempting to enter the website, users will not be allowed to enter the website once all of the pre-allocated tickets are issued.

In one embodiment, the ticket master 110 determines the number of tickets that are to be pre-allocated to the proxies 140A-C for the upcoming time period using the following equation:

$$num\_tickets\_created =$$

$$0.5 * MSS * (num\_proxies\_showed\_up/total\_num\_proxies)$$

In the above equation, "num_tickets_created" indicates the number of tickets that are to be pre-allocated to the proxies, "MSS" indicates the maximum sudden spike number, "num_proxies_showed_up" indicates the number of proxies that sent a request, and "total_num_proxies" indicates the total number of proxies. It should be noted that in some cases the ticket master 110 may not receive requests from all of the proxies 140 (e.g., due to proxy failure, a network failure, latency, etc.). The equation above accounts for such cases based on multiplying the MSS by (num_proxies_showed_up/total_num_proxies). In the above equation, MSS is multiplied by 0.5 because it may take two time periods to detect sudden spikes in users attempting to enter the website.

In one embodiment, the ticket master 110 determines the queue head for the upcoming time period using the following equation:

$$queue\_head = last\_ticket\_created$$

In the above equation, "queue_head" indicates the queue head for the upcoming time period and "last_ticket_created" indicates the ticket number of the last ticket created.

In one embodiment, the ticket master 110 determines a distribution of the pre-allocated tickets among the proxies 140 for the upcoming time period based on the number of users waiting for a ticket at respective ones of the proxies 140 and the average ticket consumption rate of respective ones of the proxies 140 (e.g., both of which may be reported by the proxies 140 in their requests). For example, the ticket master 110 may determine a distribution of the pre-allocated tickets among the proxies 140 for the upcoming time period as follows: (1) give tickets to each proxy 140 according to the number of users waiting for a ticket at that proxy 140; (2) if there are any ticket remaining after step (1), give one ticket to each proxy 140 (to ensure that every proxy gets at least one ticket); and (3) if there are any tickets remaining after step (2), divide the remaining tickets among the proxies 140 in proportion to their estimated ticket needs.

In one embodiment, the estimated ticket need of a proxy 140 is determined using the following equation:

$$estimated\_ticket\_needed = average\_ticket\_consumption\_rate * time\_period$$

In the above equation, "estimated_ticket_need" indicates the estimated ticket need of a proxy 140, "average_ticket_consumption_rate" indicates the average ticket consumption rate of the proxy 140 (e.g., as reported by the proxy 140 in its request), and "time_period" indicates the length of the upcoming time period which may be calculated by subtracting the timestamp from previous request from the timestamp of the current request (e.g., req_n.timestamp-req_n−1.timestamp, where "req_n.timestamp" indicates the timestamp indicated in the nth request, and "req_n−1.timestamp" indicates the timestamp indicated in the (n−1)th request). The assumption here is that the ticket needs of the proxy 140 for the upcoming time period will be similar to that of previous time periods.

In one embodiment, the ticket master 110 switches from being in the relaxed mode to being in the pressure mode in response to a determination that the sum of average ticket consumption rates of the proxies 140A-C is greater than a threshold ticket consumption rate. In one embodiment, the sum of the average ticket consumption rates of the proxies 140 is determined using the following equation:

$$average\_total\_ticket\_consumption\_rate = \sum average\_ticket\_consumption\_rate(proxy)$$

In the above equation, "average_total_ticket_consumption_rate" indicates the sum of the average ticket consumption rates of the proxies (e.g., as reported by the proxies 140 in their requests) and "average_ticket_consumption_rate (proxy)" indicates the average ticket consumption rate of a particular proxy.

In one embodiment, the threshold ticket consumption rate is set based on the target entrance rate. For example, the threshold ticket consumption rate may be set to a fraction of the target entrance rate. For example, the ticket master 110 may switch from being in the relaxed mode to being in the pressure mode if the below inequality holds true:

$$average\_total\_ticket\_consumption\_rate > ER * f$$

In the above inequality, "average_total_ticket_consumption_rate" indicates the sum of the average ticket consumption rates of the proxies, "ER" indicates the target entrance rate, and "f" indicates a fraction, where the fraction may be any value greater than 0 and less than 1. In one embodiment, the fraction is 0.8 but other embodiments may use a different value.

When the ticket master 110 is in the pressure mode, it may allocate tickets to the proxies 140A-C according to the number of users currently waiting for a ticket at the respective ones of the proxies 140A-C and set the queue head for the upcoming time period to be greater than the current queue head at least by the target number of users allowed to enter the website during the upcoming time period but less than the sum of the ticket number of the last ticket created and the predefined maximum sudden spike. It should be noted that the queue head for the upcoming time period is allowed to be greater than the ticket number of the last ticket created. This allows for the proxies 140 to allow users to enter the website at rate that is higher than the target entrance rate during the upcoming time period (e.g., if the rate at which users entered the website during previous time periods was lower than the target entrance rate) while ensuring that the number of users that are allowed to enter the website during the upcoming time period is bounded by the maximum sudden spike. As a result, when viewed over several time periods, the average rate at which users are allowed to enter the website may be close to the target entrance rate (e.g., where the rate at which users are allowed to enter the website during some time periods is less than the target entrance and the rate at which users are allowed to enter the website during other time periods is greater than the target entrance rate).

In one embodiment, the ticket master 110 determines the queue head for the upcoming time period using the following equations:

$$tickets\_canceled = \sum num\_tickets\_canceled(proxy)$$

$$queue\_head = min(current\_queue\_head + ER + tickets\_canceled, last\_ticket\_created + MSS)$$

In the above equations, "tickets_canceled" indicates the number of tickets canceled at the proxies 140, "num_tickets_canceled(proxy)" indicates the number of tickets canceled at a particular proxy (e.g., as reported by the proxy 140 in its request), "queue_head" indicates the queue head for the upcoming time period, "current_queue_head" indicates the current queue head, "ER" indicates the target entrance rate, "tickets_canceled" indicates the number of tickets canceled at the proxies, "last_ticket_created" indicates the ticket number of the last ticket created, and "MSS" indicates the maximum sudden spike.

In one embodiment, the ticket master 110 switches from being in the pressure mode to being in the relaxed mode in response to a determination that the queue head has been greater than the ticket number of the last ticket created for longer than a threshold consecutive length of time (e.g., queue_head>last_ticket_created consecutively for at least one hour).

In general, it is recommended that the maximum sudden spike be configured to be larger (if it can be accommodated) as this will allow for lower overall latency when the ticket master 110 is operating in the relaxed mode (since there will be more pre-allocated tickets) and will allow for achieving an entrance rate that is closer to the target entrance rate when the ticket master 110 is operating in the pressure mode (since it allows more room for allowing more users to enter the website during some time periods to compensate for other time periods in which the entrance rate was lower than the target entrance rate).

In one embodiment, the maximum sudden spike is configured to be greater than two times the target number of users allowed to enter the website during the upcoming time period. For example, the maximum sudden spike may be determined such that it satisfies the following inequality:

$$MSS > \text{total\_num\_proxies} + \text{Average}(\{\text{time\_period(proxy)}\}) * ER * 2$$

In the above inequality, "MSS" indicates the maximum sudden spike, "total_num_proxies" indicates the total number of proxies 140, "time_period(proxy)" indicates the length of the relevant time period for a particular proxy 140, and "ER" indicates the entrance rate. In one embodiment, the ticket master 110 determines the length of the relevant time period for a proxy 140 using the following equation:

$$\text{time\_period(proxy)} = \text{req\_n.timestamp} - \text{req\_n} - 1.\text{timestamp}$$

In the above equation, "time_period(proxy)" indicates the length of the relevant time period for a particular proxy, "req_n.timestamp" indicates the timestamp indicated in the nth request, and "req_n−1.timestamp" indicates the timestamp indicated in the (n−1)th request.

As used herein, a website refers to a collection of one or more web pages (e.g., a web page associated with a particular uniform resource locator (URL) or a set of web pages under a URL prefix) that are associated with the same virtual waiting room. For the sake of illustration only, embodiments are primarily described where the ticket master 110 manages the allocation of tickets for a single website. In some embodiments, the ticket master 110 may manage the allocation of tickets for more than one website. Also, the proxies 140 may implement the virtual waiting room feature for more than one website (where separate sets of tickets are required to enter the different websites).

Also, for the sake of illustration only, embodiments are primarily described where there is a single ticket master 110. It should be understood that there can be more than one ticket master 110. For example, there could be one ticket master 110 located in the United States to manage ticket allocations for websites based in the United States and another ticket master 110 located in Europe to manage ticket allocations for websites based in Europe.

Also, for the sake of illustration only, embodiments are primarily described in an environment that includes three proxies 140A-C. It should be understood that the techniques and principles described here can be applied to environments with different numbers of proxies 140.

An advantage of embodiments disclosed herein is that by pre-allocating tickets to proxies during relaxed times, the proxies 140 may admit users to the website with low latency. During relaxed times, a spike of users may be allowed to enter the website that exceeds the target entrance rate but this will only occur for a short time (e.g., one or two time periods). During pressure times, the queue head is set in such a way that allows the proxies 140 to admit users to the website at a rate that is close to the predefined target entrance rate. In both relaxed times and pressure times, embodiments ensure that the number of users that are admitted to the website during a time period is always bounded by a predefined maximum sudden spike.

Embodiments use an architecture where the proxies 140 periodically approach the ticket master 110 to provide information about its status and to obtain tickets. This helps create a stable architecture for the ticket master 110 even during pressure times, as most of the load is absorbed by the proxies 140 and the number of requests sent by the proxies 140 to the ticket master 110 is more or less constant (assuming the number of proxies 140 stays constant).

While embodiments have been described that limit the number of users allowed to enter a website, the techniques and principles described herein can also be used to limit the number of active users that are allowed to browse a website in a similar manner. Other variations of embodiments described herein will be contemplated by those of ordinary skill in the relevant art.

Figure 2:
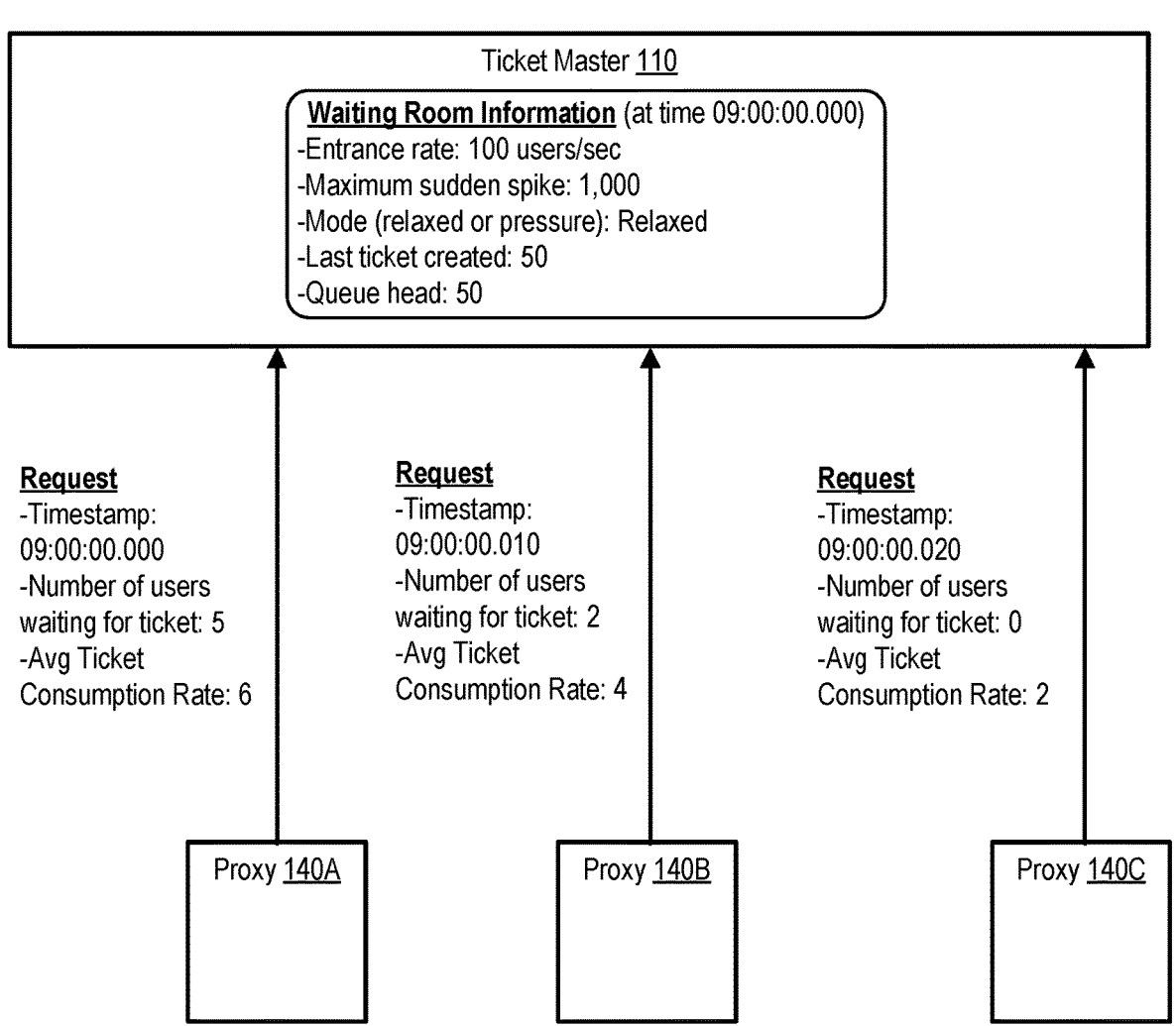
FIG. 2 is a diagram showing an example of requests sent by the proxies to the ticket master to illustrate relaxed mode operations, according to some embodiments.

FIG. 2 is a diagram showing an example of requests sent by the proxies to the ticket master to illustrate relaxed mode operations, according to some embodiments.

In this example, the ticket master 110 is operating in the relaxed mode. As shown in the figure, the ticket master 110 maintains information regarding a virtual waiting room feature for a website. At time 09:00:00.000, the waiting room information indicates that the target entrance rate is 100 users per second, the maximum sudden spike is 1,000, the mode is the relaxed mode, the last ticket created is 50, and the queue head is 50.

In this example, proxy 140A, proxy 140B, and proxy 140C each send a request to the ticket master 110. The request sent by proxy 140A indicates that the timestamp is 09:00:00.000, the number of users waiting for a ticket at proxy 140A is 5, and the average ticket consumption rate of proxy 140A is 6 tickets per second. The request sent by proxy 140B indicates that the timestamp is 09:00:00.010, the number of users waiting for a ticket at proxy 140B is 2, and the average ticket consumption rate of proxy 140B is 4 tickets per second. The request sent by proxy 140C indicates that the timestamp is 09:00:00.020, the number of users waiting for a ticket at proxy 140C is 0, and the average ticket consumption rate of proxy 140C is 2 tickets per second.

Figure 3:
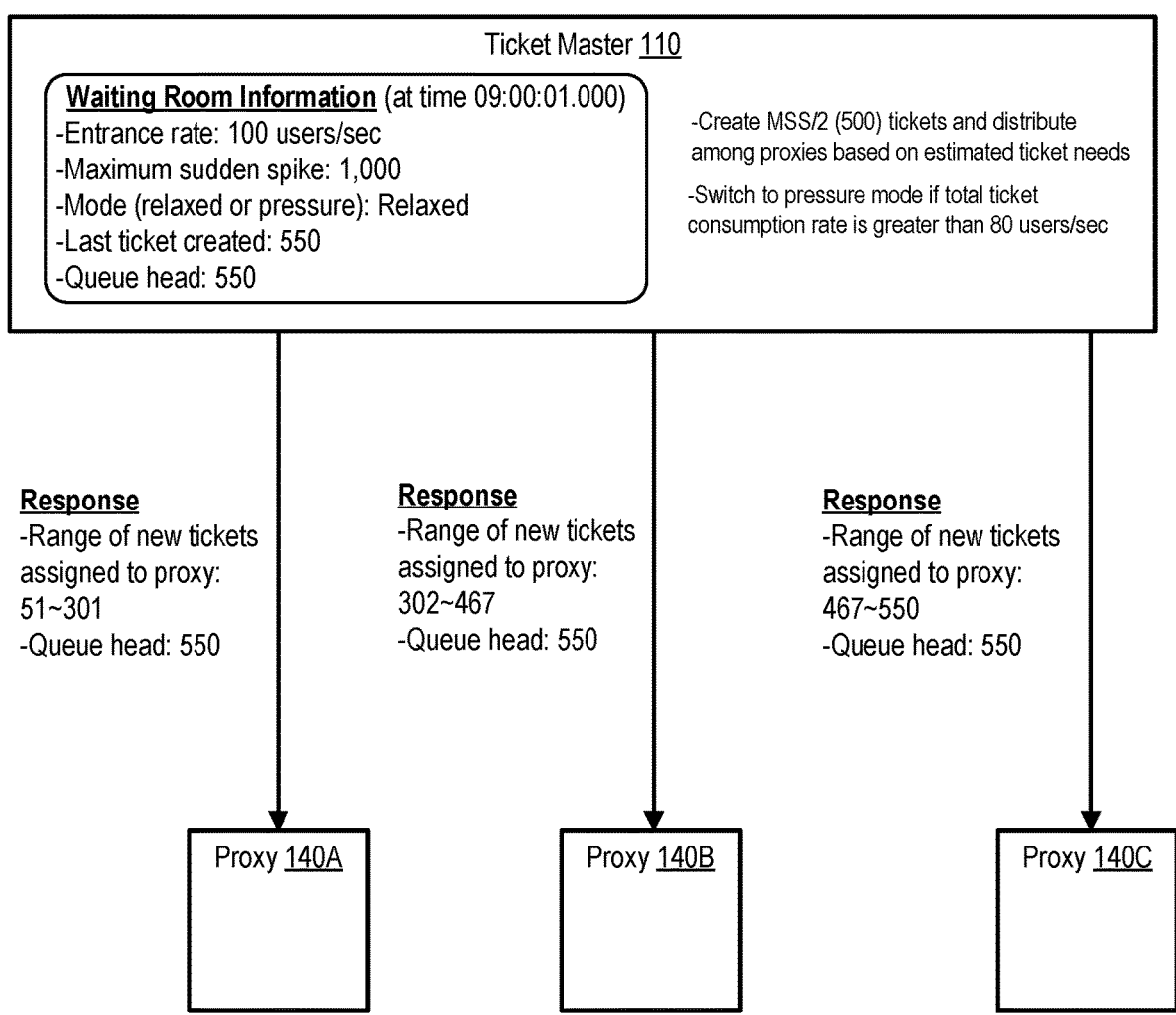
FIG. 3 is a diagram showing an example of responses sent by the ticket master to the proxies to illustrate relaxed mode operations, according to some embodiments.

FIG. 3 is a diagram showing an example of responses sent by the ticket master to the proxies to illustrate relaxed mode operations, according to some embodiments. This example continues the example described with reference to FIG. 2. In this example, the ticket master 110 is operating in the relaxed mode.

The ticket master 110 determines the number of tickets to pre-allocate to the proxies for the upcoming time period to be half of the maximum sudden spike number, which in this example is 500 tickets (1,000/2=500). The ticket master 110 then determines a distribution of those tickets among the proxies 140A-C based on the number of users waiting for a ticket at respective ones of the proxies 140A-C and the average ticket consumption rate of respective ones of the proxies 140A-C. In this example, the ticket master 110 determines the number of tickets to pre-allocate to each proxy 140 based on the following equation:

$$num\_pending\_tickets + 1 + num\_remaining\_tickets *$$

$$(num\_estimated\_needed\_tickets/total\_num\_estimated\_needed\_tickets)$$

In the above equation, "num_pending_tickets" indicates the number of users waiting for a ticket at the proxy 140, "num_remaining_tickets" indicates the number of remaining tickets after distributing all pending tickets and one extra ticket per proxy, "num_estimated_needed_tickets" indicates average ticket consumption rate multiplied by the sample period length, and "total_num_estimated_needed_tickets" indicates the total number of estimated needed tickets across all proxies.

Thus, in this example, the ticket master 110 determines that proxy 140A is to be pre-allocated 251 tickets (5+1+ 490*(6*1/12)=251 tickets), proxy 140B is to be allocated 166 tickets (2+1+490*(4*1/12)=166 tickets), and proxy 140C is to be pre-allocated 83 tickets (0+1+490*(2*1/ 12)=83 tickets). The last ticket number becomes 550 (50+ 500=550) and the queue head also becomes 550.

The ticket master 110 may send responses to the proxies 140A-C to pre-allocate tickets to the proxies 140A-C according to the distribution and provide the queue head. In this example, the response sent to proxy 140A indicates that the range of new tickets allocated to proxy 140A is 51-301 (for a total of 251 tickets) and the queue head is 550, the response sent to proxy 140B indicates that the range of new tickets allocated to proxy 140B is 302-467 (for a total of 166 tickets) and the queue head is 550, and the response sent to proxy 140C indicates that the range of new tickets allocated to proxy 140C is 467-550 (for a total of 83 tickets) and the queue head is 550. This example assumes that the ticket master 110 sends responses to the proxies 140A-C after determining how many tickets to pre-allocate for all of the proxies 140A-C (and so all of the responses sent to the proxies 140A-C indicate that the queue head is 550). In another embodiment, the ticket master 110 may send responses to each proxy 140 as it determines how many tickets to pre-allocate for that proxy 140 (e.g., so the response sent to proxy 140A may indicate that the queue head is 301, the response sent to proxy 140B may indicate that the queue head is 467, and the response sent to proxy 140C may indicate that the queue head is 550).

The ticket master 110 may switch from being in the relaxed mode to the pressure mode if ticket consumption rate of the proxies is greater than a threshold ticket consumption rate (e.g., 80 users per second).

Figure 4:
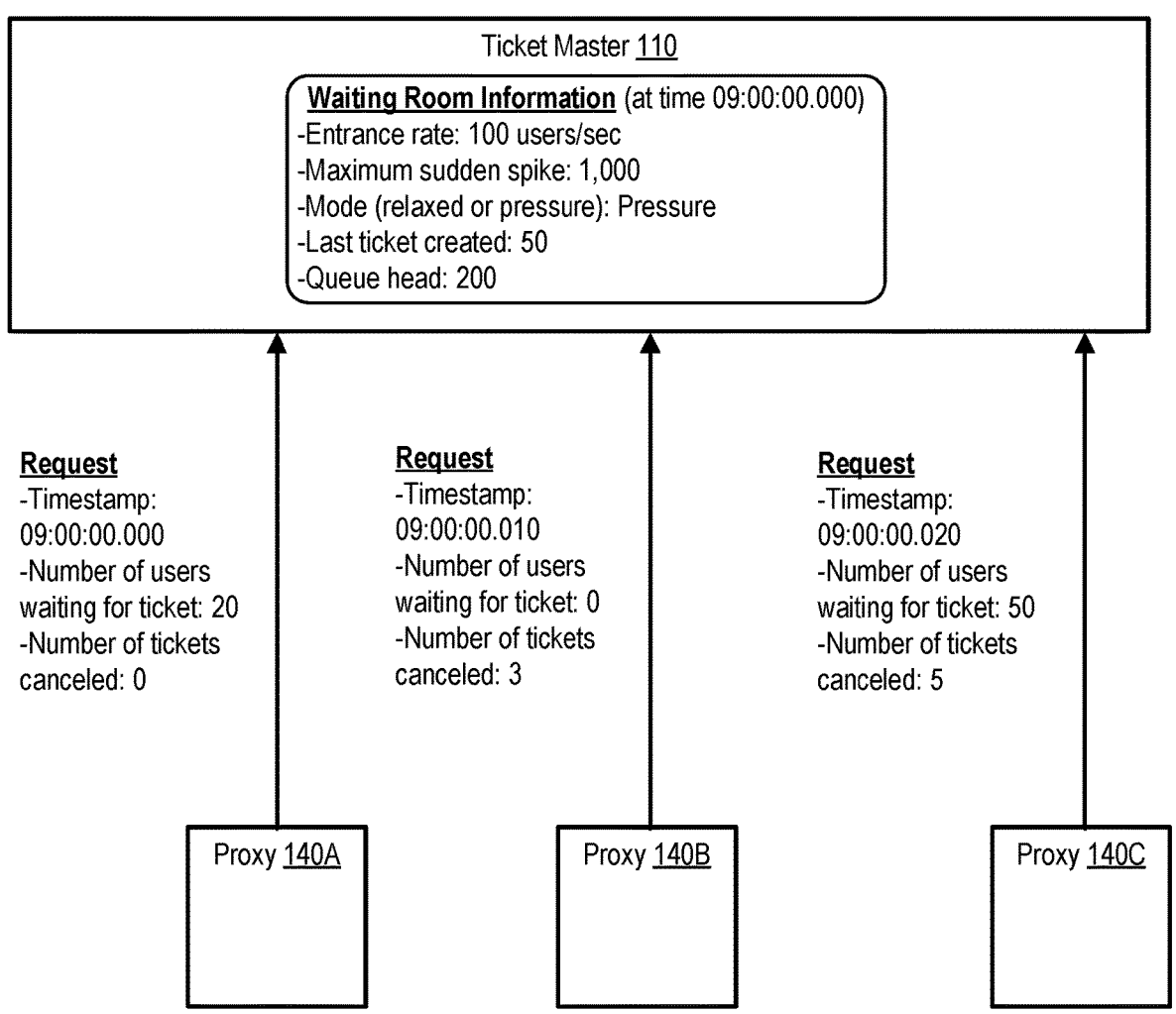
FIG. 4 is a diagram showing an example of requests sent by the proxies to the ticket master to illustrate pressure mode operations, according to some embodiments.

FIG. 4 is a diagram showing an example of requests sent by the proxies to the ticket master to illustrate pressure mode operations, according to some embodiments.

In this example, the ticket master 110 is operating in the pressure mode. As shown in the figure, the ticket master 110 maintains information regarding a virtual waiting room for a website. At time 09:00:00.000, the information indicates that the target entrance rate is 100 users per second, the maximum sudden spike is 1,000, the mode is the pressure mode, the last ticket created is 50, and the queue head is 200.

In this example, proxy 140A, proxy 140B, and proxy 140C each send a request to the ticket master 110. The request sent by proxy 140A indicates that the timestamp is 09:00:00.000, the number of users waiting for a ticket at proxy 140A is 20, and the number of tickets canceled at proxy 140A is 0. The request sent by proxy 140B indicates that the timestamp is 09:00:00.010, the number of users waiting for a ticket at proxy 140B is 0, and the number of tickets canceled at proxy 140B is 3. The request sent by proxy 140C indicates that the timestamp is 09:00:00.020, the number of users waiting for a ticket at proxy 140C is 50, and the number of tickets canceled at proxy 140C is 5.

Figure 5:
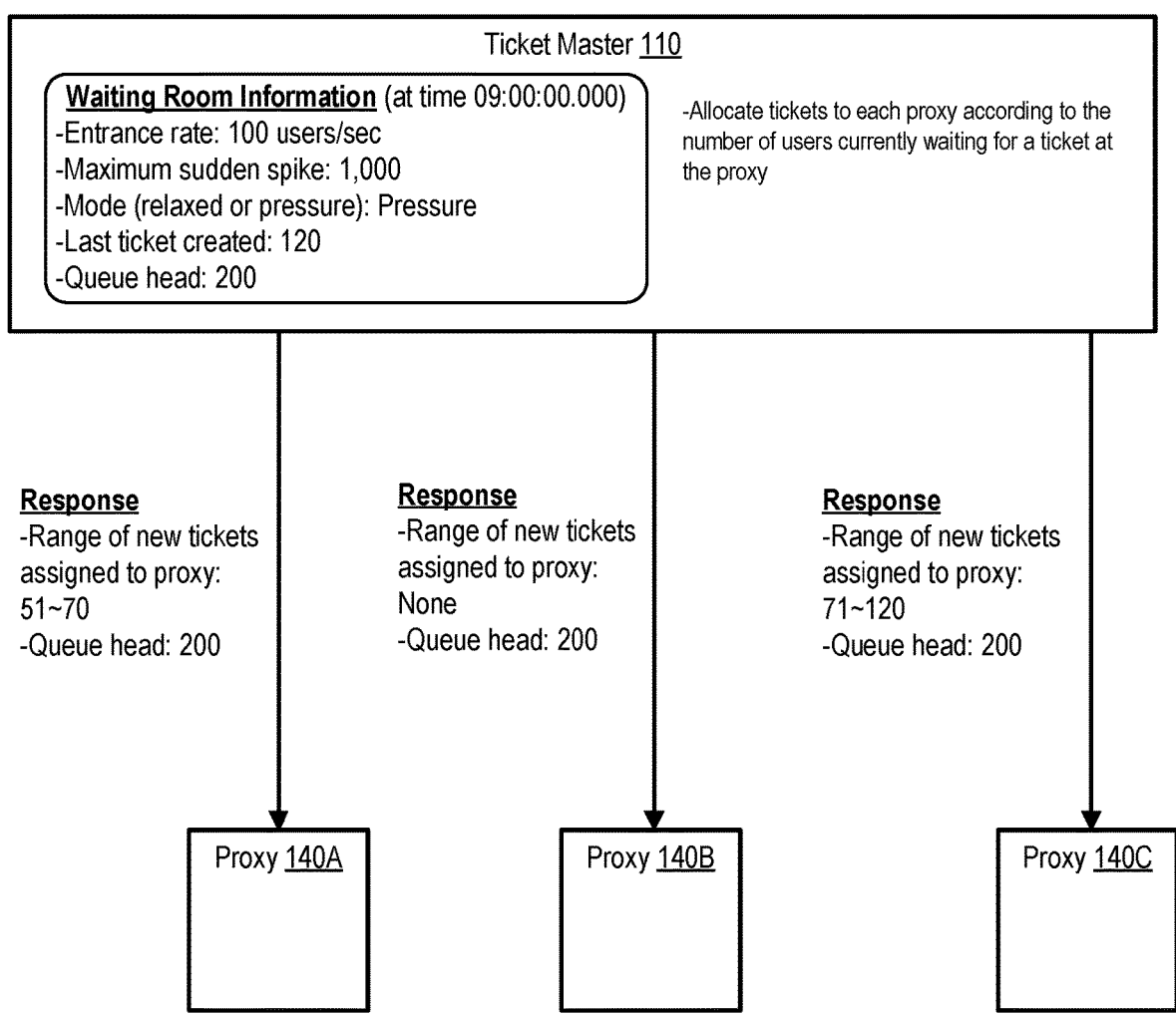
FIG. 5 is a diagram showing an example of responses sent by the ticket master to the proxies to illustrate pressure mode operations, according to some embodiments.

FIG. 5 is a diagram showing an example of responses sent by the ticket master to the proxies to illustrate pressure mode operations, according to some embodiments. This example continues the example described with reference to FIG. 4. In this example, the ticket master 110 is operating in the pressure mode.

The ticket master 110 determines the number of tickets to allocate to each of the proxies for the upcoming time period according to the number of users waiting for a ticket at respective ones of the proxies. Thus, in this example, the ticket master 110 determines that 140A is to be allocated 20 tickets, proxy 140B is to be allocated no tickets, and proxy 140C is to be allocated 50 tickets.

The ticket master 110 may send responses to the proxies 140A-C to allocate tickets and provide the queue head. In this example, the response sent to proxy 140A indicates that the range of new tickets allocated to proxy 140A is 51-70 (for a total of 20 tickets) and the queue head is 200, the response sent to proxy 140B indicates that no new tickets are allocated to proxy 140B and the queue head is 200, and the response sent to proxy 140C indicates that the range of new tickets allocated to proxy 140C is 71-120 (for a total of 50 tickets) and the queue head is 200. The last ticket created becomes 120 (50+70 new tickets allocated=120). It should be noted that when the ticket master 110 is in the pressure mode, it may allocate tickets to each of the proxies 140A-C without delay (immediately after receiving a request without waiting to collect requests from multiple proxies 140).

FIG. 6 is a diagram showing an example of a further request sent by a proxy to the ticket master and the corresponding response sent by the ticket master to the proxy to illustrate pressure mode operations, according to some embodiments. This example continues the example described with reference to FIG. 5. In this example, the ticket master is operating in the pressure mode.

The ticket master 110 may set the queue head for the next time period using the following equation:

$$queue\_head = min(current\_queue\_head + ER + tickets\_canceled,$$

$$last\_ticket\_created + MSS)$$

In the above equation, "current_queue_head" is 200, "ER" is 100, "tickets_canceled" is 8, "last_ticket_created" is 120, and MSS is 1,000. Thus, the queue head is set to 308

$$(min(200 + 100 + 8 = 308, 120 + 1000 = 1120) = 308).$$

In this example, proxy 140A sends a request to the ticket master 110. The request indicates that the timestamp is 09:00:01.000, the number of users waiting for a ticket at proxy 140A is 25, and the number of tickets canceled at proxy 140A is 0. The ticket master 110 determines the number of tickets to allocate to proxy 140A according to the number of users waiting for a ticket at proxy 140A, which in this example is 25. Thus, ticket master 110 determines that proxy 140A is to be allocated 25 tickets. The ticket master 110 then sends a corresponding response to proxy 140A to allocate those tickets to proxy 140A and provide the queue head. In this example, the response indicates that the range of new tickets allocated to proxy 140A is 121-45 (for a total of 25 tickets) and the queue head is 308. The last ticket created changes from 120 to 145 (120+25 new tickets allocated=145).

The ticket master 110 may switch from being in the pressure mode to the relaxed mode if the queue head is greater than the ticket number of the last ticket created for longer than a threshold consecutive length of time (e.g., for one hour).

Figure 7:
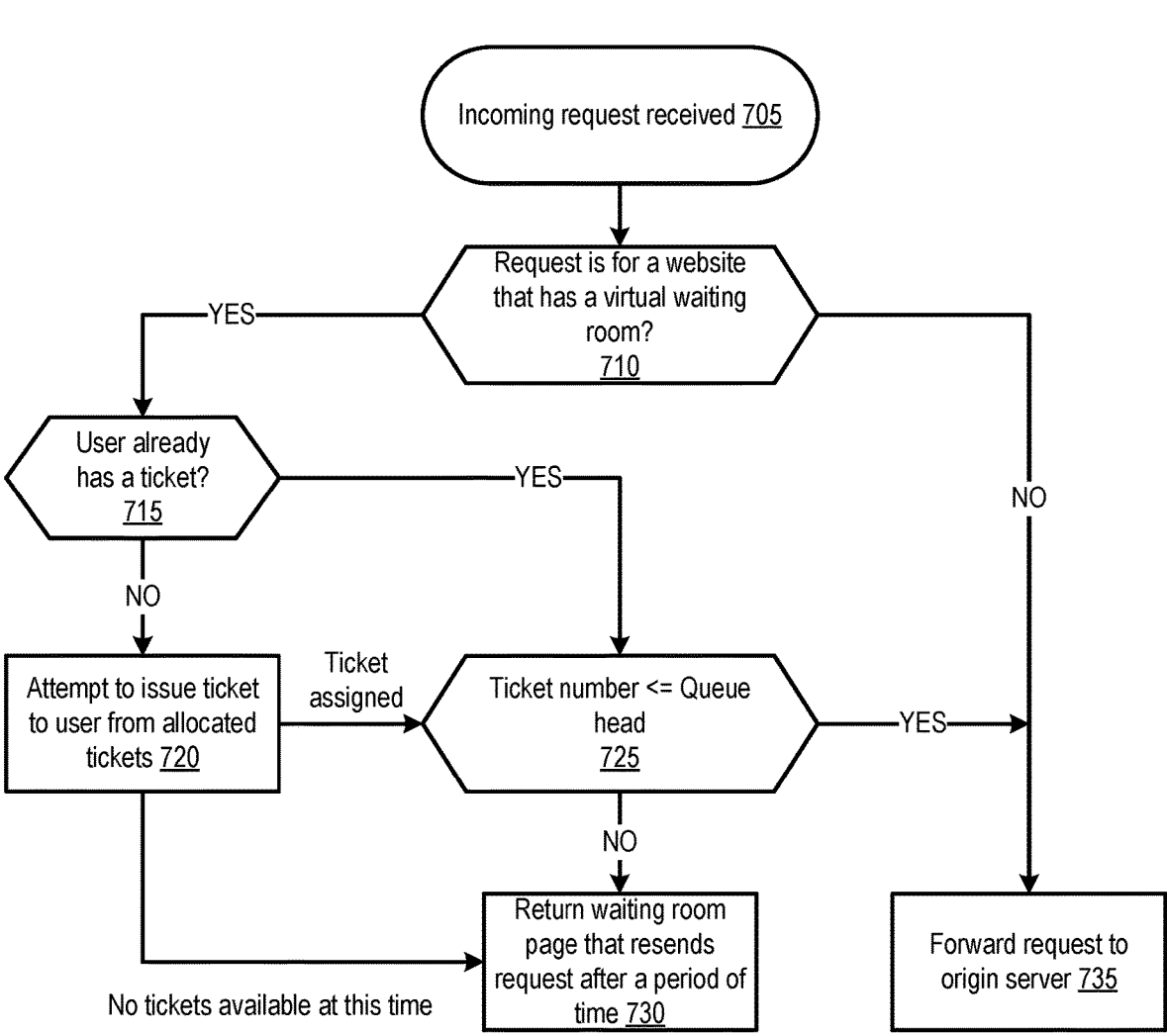
FIG. 7 is a flow diagram of a method by a proxy to implement the enforcement aspect of a virtual waiting room feature for a website, according to some embodiments.

FIG. 7 is a flow diagram of a method by a proxy to implement the enforcement aspect of a virtual waiting room feature for a website, according to some embodiments. The proxy 140 may be communicatively coupled to a ticket master 110 that allocates tickets for the website. The method may be implemented using hardware, software, firmware, or any combination thereof.

The operations in the flow diagram are described with reference to the exemplary embodiments of the other diagrams. However, it should be understood that the operations of the flow diagram can be performed by embodiments other than those discussed with reference to these other diagrams, and the embodiments discussed with reference to these other diagrams can perform operations different than those discussed with reference to the flow diagram. Also, while the flow diagram shows a particular order of operations performed by certain embodiments, it should be understood that such order is exemplary (e.g., alternative embodiments may perform the operations in a different order, combine certain operations, overlap certain operations, etc.).

As shown in the diagram, the method is initiated at operation 705 when the proxy receives an incoming request from a user to enter the website. At operation 710, the proxy determines whether the request is for a website that has a virtual waiting room. If not, then at operation 735, the proxy forwards the request to the origin server (allowing the user to enter the website). If the website does have a virtual waiting room, then at operation 715, the proxy determines whether the user has already been issued a ticket for the website. If not, at operation 720, the proxy attempts to issue a ticket to the user from its allocated tickets. If the proxy does not have any tickets available to issue, then at operation 730, the proxy returns a waiting room page to the user. The waiting room page may resend the user's request after a period of time (to try to enter the website). If the user has already been issued a ticket or the proxy is able to issue a ticket to the user, then at operation 725, the proxy determines whether the ticket number of the user's ticket is equal to or less than the queue head. If not, then at operation 735, the proxy returns a waiting room page to the user. Otherwise, if the ticket number of the user's ticket is equal to or less than the queue head, then the proxy forwards the request to the origin server (allowing the user to enter the website).

Figure 8:
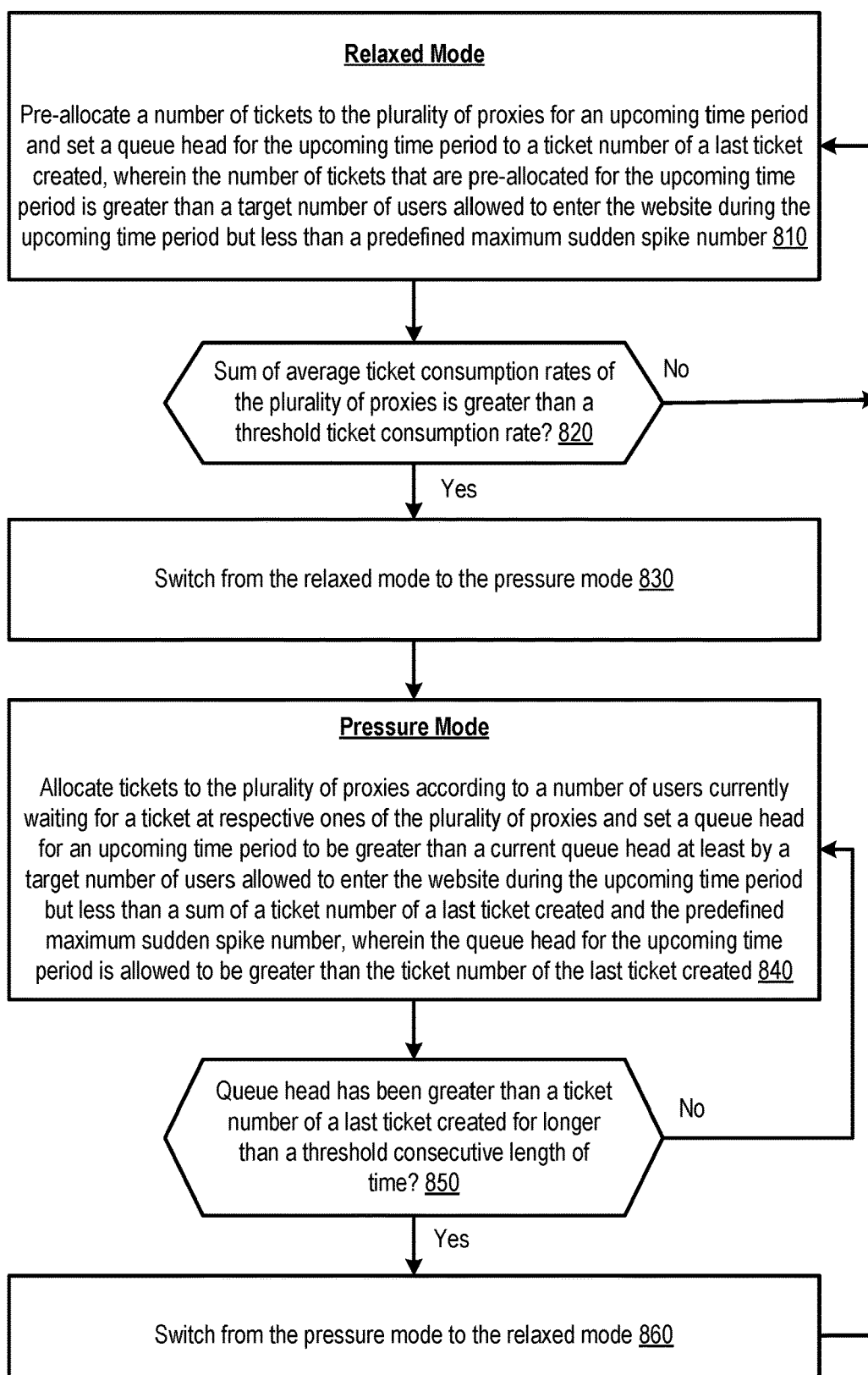
FIG. 8 is a flow diagram of a method by a ticket master to allocate tickets for a website that has a virtual waiting room, according to some embodiments.

FIG. 8 is a flow diagram of a method by a ticket master to allocate tickets for a website that has a virtual waiting room, according to some embodiments. The ticket master 110 may be communicatively coupled to a plurality of proxies 140 controlling access to the website. The method may be implemented using hardware, software, firmware, or any combination thereof.

As shown in the diagram, the method is initiated at operation 810, where the ticket master is in relaxed mode. At operation 810, the ticket master pre-allocates a number of tickets to the plurality of proxies for an upcoming time period and sets a queue head for the upcoming time period to a ticket number of a last ticket created, wherein the number of tickets that are pre-allocated for the upcoming time period is greater than a target number of users allowed to enter the website during the upcoming time period but less than a predefined maximum sudden spike number.

At operation 820, the ticket master determines whether the sum of average ticket consumption rates of the plurality of proxies is greater than a threshold ticket consumption rate. If not, then the ticket master stays in the relaxed mode and proceeds back to operation 810. Otherwise, if the ticket master determines at operation 820 that the sum of average ticket consumption rates of the plurality of proxies is greater than the threshold ticket consumption rate, then at operation 830, the ticket master switches from the relaxed mode to the pressure mode and proceeds to operation 840.

At operation 840, the ticket master is in the pressure mode. At operation 840, the ticket master allocates tickets to the plurality of proxies according to a number of users currently waiting for a ticket at respective ones of the plurality of proxies and sets a queue head for an upcoming time period to be greater than a current queue head at least by a target number of users allowed to enter the website during the upcoming time period but less than a sum of a ticket number of a last ticket created and the predefined maximum sudden spike number, wherein the queue head for the upcoming time period is allowed to be greater than the ticket number of the last ticket created.

At operation 850, the ticket master determines whether the queue head has been greater than a ticket number of a last ticket created for longer than a threshold consecutive length of time. If not, then the ticket master stays in the pressure mode and proceeds back to operation 840. Otherwise, if the ticket master determines at operation 850 that the queue head has been greater than the ticket number of the last ticket created for longer than a threshold consecutive length of time, then at operation 860, the ticket master switches from the pressure mode to the relaxed mode and proceeds to operation 810.

Figure 9:
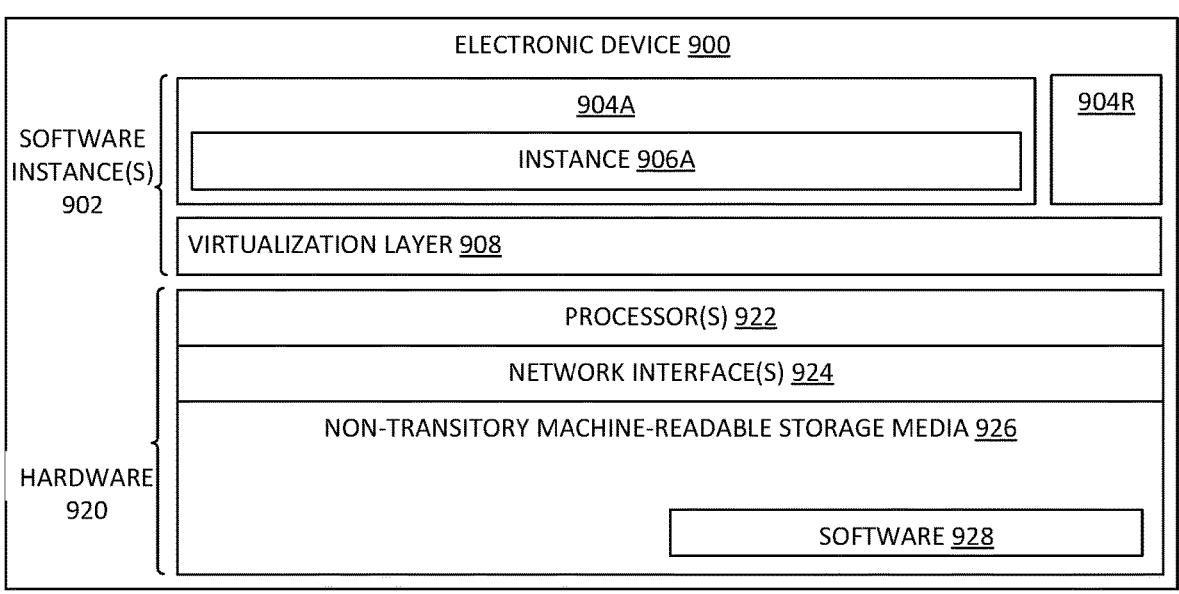
FIG. 9 is a block diagram illustrating an electronic device, according to some embodiments.

FIG. 9 is a block diagram illustrating an electronic device, according to some embodiments. FIG. 9 illustrates hardware 920 comprising a set of one or more processor(s) 922, a set of one or more network interfaces 924 (wireless and/or wired), and non-transitory machine-readable storage medium/media 926 having stored therein software 928 (which includes instructions executable by the set of one or more processor(s) 922). Software 928 can include code, which when executed by hardware 920, causes the electronic device 900 to perform operations of one or more embodiments described herein (e.g., operations of a ticket master for allocating tickets to proxies and/or operations of a proxy for implementing a virtual waiting room).

In electronic devices that use compute virtualization, the set of one or more processor(s) 922 typically execute software to instantiate a virtualization layer 908 and software container(s) 904A-R (e.g., with operating system-level virtualization, the virtualization layer 908 represents the kernel of an operating system (or a shim executing on a base operating system) that allows for the creation of multiple software containers 904A-R (representing separate user space instances and also called virtualization engines, virtual private servers, or jails) that may each be used to execute a set of one or more applications; with full virtualization, the virtualization layer 908 represents a hypervisor (sometimes referred to as a virtual machine monitor (VMM)) or a hypervisor executing on top of a host operating system, and the software containers 904A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 928 (illustrated as instance 906A) is executed within the software container 904A on the virtualization layer 908. In electronic devices where compute virtualization is not used, the instance 906A on top of a host operating system is executed on the "bare metal" electronic device 900. The instantiation of the instance 906A, as well as the virtualization layer 908 and software containers 904A-R if implemented, are collectively referred to as software instance(s) 902.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/ or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more computing devices functioning as a ticket master for a website that has a virtual waiting room, wherein the ticket master is communicatively coupled to a plurality of proxies controlling access to the website, the method comprising:

when the ticket master is in a pressure mode, allocating tickets to the plurality of proxies based on a number of users waiting for a ticket at respective ones of the plurality of proxies and setting a queue head for a first upcoming time period, wherein the queue head for the first upcoming time period is allowed to be greater than a ticket number of a last ticket created, wherein the plurality of proxies allows users possessing a ticket having a ticket number that is less than the queue head to access the website, and wherein the allocating tickets to the plurality of proxies comprises:

transmitting, to each of the plurality of proxies, a range of ticket numbers allocated to the proxy and the queue head for the first upcoming time period.

2. The method of claim 1, wherein the queue head for the first upcoming time period is set to be greater than a current queue head at least by a target number of users allowed to enter the website during the first upcoming time period but less than a sum of the ticket number of the last ticket created and a predefined maximum sudden spike number.

3. The method of claim 2, wherein the queue head for the first upcoming time period is set to be a lesser of (1) current_queue_head+entrance_rate (ER)+tickets_canceled and (2) last_ticket_created+maximum_sudden_spike (MSS), wherein current_queue_head indicates the current queue head, ER indicates the target number of users allowed to enter the website during the first upcoming time period, tickets_canceled indicates a number of tickets canceled at the plurality of proxies, last_ticket_created indicates the ticket number of the last ticket created, and MSS indicates the predefined maximum sudden spike number.

4. The method of claim 1, further comprising:

switching from the pressure mode to a relaxed mode in response to a determination that the queue head has been greater than a ticket number of a last ticket created for longer than a threshold consecutive length of time.

5. The method of claim 4, further comprising:

when the ticket master is in a relaxed mode, pre-allocating a number of tickets to the plurality of proxies for a second upcoming time period and setting a queue head for the second upcoming time period to a ticket number of a last ticket created, wherein the number of tickets that are pre-allocated for the second upcoming time period is greater than a target number of users allowed to enter the website during the second upcoming time period but less than a predefined maximum sudden spike number.

6. The method of claim 5, wherein the pre-allocating comprises: transmitting, to each of the plurality of proxies, a range of ticket numbers allocated to the proxy and the queue head for the second upcoming time period.

7. The method of claim 5, wherein the tickets that are pre-allocated for the second upcoming time period are distributed among the plurality of proxies based on a number of users waiting for a ticket at respective ones of the plurality of proxies and an average ticket consumption rate of respective ones of the plurality of proxies.

8. The method of claim 5, wherein the number of tickets that are pre-allocated for the second upcoming time period is half of the predefined maximum sudden spike number.

9. The method of claim 5, wherein when the ticket master is in the relaxed mode, the ticket master pre-allocates tickets to the plurality of proxies for each of a plurality of time periods, wherein the tickets pre-allocated for one of the plurality of time periods replaces the tickets pre-allocated for a previous one of the plurality of time periods.

10. The method of claim 4, further comprising:
  switching from the relaxed mode to the pressure mode in response to a determination that a sum of average ticket consumption rates of the plurality of proxies is greater than a threshold ticket consumption rate.

11. The method of claim 1, wherein the ticket master manages ticket allocations for a plurality of websites each having separate virtual waiting rooms.

12. A non-transitory machine-readable storage medium that provides instructions that, if executed by a processor of a computing device functioning as a ticket master for a website that has a virtual waiting room, will cause said ticket master to perform operations for allocating tickets to a plurality of proxies controlling access to the website, the operations comprising:
  when the ticket master is in a pressure mode, allocating tickets to the plurality of proxies based on a number of users waiting for a ticket at respective ones of the plurality of proxies and setting a queue head for a first upcoming time period, wherein the queue head for the first upcoming time period is allowed to be greater than a ticket number of a last ticket created, wherein the plurality of proxies allows users possessing a ticket having a ticket number that is less than the queue head to access the website, and wherein the allocating tickets to the plurality of proxies comprises:
    transmitting, to each of the plurality of proxies, a range of ticket numbers allocated to the proxy and the queue head for the first upcoming time period.

13. The non-transitory machine-readable storage medium of claim 12, wherein the queue head for the first upcoming time period is set to be greater than a current queue head at least by a target number of users allowed to enter the website during the first upcoming time period but less than a sum of the ticket number of the last ticket created and a predefined maximum sudden spike number.

14. The non-transitory machine-readable storage medium of claim 13, wherein the queue head for the first upcoming time period is set to be a lesser of (1) current_queue_head+ entrance_rate (ER)+tickets_canceled and (2) last_ticket-_created+maximum_sudden_spike (MSS), wherein current_ queue_head indicates the current queue head, ER indicates the target number of users allowed to enter the website during the first upcoming time period, tickets_canceled indicates a number of tickets canceled at the plurality of proxies, last_ticket_created indicates the ticket number of the last ticket created, and MSS indicates the predefined maximum sudden spike number.

15. The non-transitory machine-readable storage medium of claim 12, wherein the operations further comprise:
  switching from the pressure mode to a relaxed mode in response to a determination that the queue head has been greater than a ticket number of a last ticket created for longer than a threshold consecutive length of time.

16. The non-transitory machine-readable storage medium of claim 15, wherein the operations further comprise:
  when the ticket master is in a relaxed mode, pre-allocating a number of tickets to the plurality of proxies for a second upcoming time period and setting a queue head for the second upcoming time period to a ticket number of a last ticket created, wherein the number of tickets that are pre-allocated for the second upcoming time period is greater than a target number of users allowed to enter the website during the second upcoming time period but less than a predefined maximum sudden spike number.

17. A computing device to function as a ticket master for a website that has a virtual waiting room, wherein the ticket master is to be communicatively coupled to a plurality of proxies controlling access to the website, the computing device comprising:
  one or more processors; and
  a non-transitory machine-readable storage medium having instructions stored therein, which when executed by the one or more processors, causes the ticket master to:
  when the ticket master is in a pressure mode, allocate tickets to the plurality of proxies based on a number of users waiting for a ticket at respective ones of the plurality of proxies and setting a queue head for a first upcoming time period, wherein the queue head for the first upcoming time period is allowed to be greater than a ticket number of a last ticket created, wherein the plurality of proxies allows users possessing a ticket having a ticket number that is less than the queue head to access the website, and wherein the allocating tickets to the plurality of proxies comprises:
    transmitting, to each of the plurality of proxies, a range of ticket numbers allocated to the proxy and the queue head for the first upcoming time period.

\* \* \* \* \*